United States Patent [19]

Dennis

[11] Patent Number: 4,484,313
[45] Date of Patent: Nov. 20, 1984

[54] SYSTEM FOR MEASURING SHEAR WAVE TRAVEL TIMES

[75] Inventor: John R. Dennis, Duncan, Okla.
[73] Assignee: Halliburton Company, Duncan, Okla.
[21] Appl. No.: 321,351
[22] Filed: Nov. 16, 1981

Related U.S. Application Data

[63] Continuation-in-part of Ser. No. 141,015, Apr. 17, 1980, abandoned.

[51] Int. Cl.$^3$ .......................... G01V 1/40; G01V 1/20
[52] U.S. Cl. .......................................... 367/27; 367/75
[58] Field of Search ...................... 367/26, 27, 31, 34, 367/75; 73/597, 598, 60; 364/421

[56] References Cited

U.S. PATENT DOCUMENTS

| | | | |
|---|---|---|---|
| 3,900,824 | 8/1975 | Trouiller et al. | 367/34 |
| 4,210,966 | 7/1980 | Ingram | 367/27 |
| 4,223,398 | 9/1980 | Blalock | 367/27 |
| 4,320,470 | 3/1982 | Anglern | 367/34 |
| 4,346,460 | 8/1982 | Schuster | 367/27 |

FOREIGN PATENT DOCUMENTS 1977710  9/1977  U.S.S.R. .............................. 367/26

OTHER PUBLICATIONS

Scott et al., "Acoustic Logging for Mining Applications", 6/5/74, pp. 1-10.
Koerparich, "Sheer Wave Velocities . . . Devices", pp. 317-326, Sec. of Petr. Eng. Jour., 10/80.

*Primary Examiner*—Nelson Moskowitz
*Attorney, Agent, or Firm*—William J. Beard

[57] ABSTRACT

A system for ascertaining with certainty that detected return acoustic cycles are shear wave cycles for the calculation of shear wave travel times using the known travel time relationship that shear wave travel times are equal to 1.55 to 1.9 times the compressional wave travel time for the same acoustic wave through most geological formations. The system determines the compressional wave travel time and determines after what point following the compression wave return that shear wave cycles are occurring. The validity of the shear wave travel time determinations using shear wave cycles after such time and that no cycles used for such measurement are skipped is assured by determining that the shear wave travel time is within the acceptable limits of 1.55 to 1.9 times the compressional wave travel time.

5 Claims, 3 Drawing Figures

SYSTEM FOR MEASURING SHEAR WAVE TRAVEL TIMES

This application is a continuation-in-part of Copending U.S. patent application Ser. No. 141,015 filed Apr. 17, 1980 and now abandoned.

BACKGROUND OF THE INVENTION

1. Field of the Invention

This invention pertains to measurement of acoustic wave travel time and more particularly to the discrimination of shear waves in a return acoustical logging signal and the determination of shear wave travel times without using an erroneously selected return cycle for such measurement.

2. Description of the Prior Art

It is well known that an acoustic wave induced into a geological formation produces a plurality of wave propagation modes which can be received and detected to give information about the formation. Two of the most useful wave mode components of such an acoustic wave are the compression wave and the shear wave. The compression wave is the strongest and most rapidly travelling of the wavefronts and results from a compression-type impact on a geological interface. The shear wave, on the other hand, is a slower moving wavefront and is a result of lateral propagation along an interface.

Although the compression wave characteristics provide much valuable information by itself, it does not provide some of the information that is revealed by the shear wave returns or by a comparison of the compression wave returns with the shear wave returns. For example, fissures that are approximately normal to an acoustic wave would not cause an appreciable compression wave attenuation but would cause appreciable shear wave attenuation. Also, fluids have a different effect on the appearance of a compression wave as compared with the appearance of a shear wave, both with respect to amplitude and travel time.

One of the important values that is provided is the velocity or travel time values of the various components of the overall acoustic wave. In the above discussion for example, it is true that different valuable information is revealed about the formation from the velocity or travel time of the compression wavefront and from the information provided by the velocity or travel time of the shear wavefront. The compression wavefront is fairly easy to recognize and to measure the speed of by the use of spaced-apart receivers since, as mentioned above, the compression wave returns are the first returns received following an acoustic impulse event induced into the formation.

It is not always so easy to recognize the shear wavefront arrival at a receiver and to take its measurement. If a wrong cycle of a return is selected as detected by the second of spaced-apart receivers compared with the cycle detected by the first receiver, erroneous and obvious misleading results are indicated.

Pickett, et al., U.S. Pat. No. 3,276,533, is directed to a method of identifying the arrival of shear wave components in two received acoustic signals in well logging operations. The method there disclosed is based on the recognition of wave components having different velocities in each of the received signals. The arrival times of the beginning of the compressional waves in the first and second received signals are detected ($T_{11}$ and $T_{12}$ in FIG. 4). The time delay between the time of the arrival of the compressional wave and each successive peak in the signal is computed for each signal. The ratio of the time delays for corresponding peaks (i.e., first, second, etc.) in the two received signals is observed after each successive peak detection, and the first peaks for which the ratio is significantly different from unity are labelled as the first shear wave peaks for their respective signals. A cycle skipping, of course, would cause this same result, and go undetected, in the Pickett, et al. method. Further, there is no recognition of shear waves with respect to a standard, such as with respect to the arrival of the compressional waves. As will be explained hereinafter, there is a relationship which the Pickett, et al. method does not utilize at all.

Engle, U.S. Pat. No. 3,467,875, discloses a method and apparatus for eliminating cycle skipping in acoustic well logging. A value representative of the maximum acceptable time change which can occur between successive sample time values in successive received acoustic waves is stored in a maximum delta circuit 24. The time difference between transmission and receipt of an incoming signal is compared with that of a previously validated signal stored in a digital-to-analog converter 20 to determine if the incoming signal falls within the acceptable range. If it does, it is established as the new valid signal and is recorded for logging. The Engle Patent fails to disclose the use of a predetermined relationship betweeen compressional and shear components of acoustic waves as a basis of validation of received signals.

Trouiller, et al, U.S. Pat. No. 3,900,824, discloses a method for the elimination of cycle skipping which is similar to that of the Engle patent method. In the Trouiller patent method, the maximum acceptable difference between time values of successive measurement signals is computed as a given fraction of the average period of the acoustic waves transmitted by the transmitter in the logging tool. The Trouiller patent method does not employ utilization of a predetermined relationship between compressional and shear components of acoustic waves for shear wave identification.

Elliott, et al, U.S. Pat. No. 3,390,377, utilizes at least a pair of receivers spaced apart in a borehole for receiving formation compressional and shear wave returns, adjusting the amplitude and time of the second receiver to correspond with that of the first receiver and cancelling the first returns by the second returns, the remaining returns presumably being those other than compressional waves. Although such technique may enhance the presence of shear waves, it is not the technique employed herein by Applicant and does not assure against false data being interpreted as true data because of cycle skipping.

Waters, et al, U.S. Pat. No. 3,302,164, shows the development of compressional wave induced returns using a particular type of transmitter as well as the development of shear wave induced returns using a different acoustical generator for comparison purposes. The technique may give some information about shear waves, but it does not employ the technique utilized as set forth herein.

The technique described herein employs a relationship that is known to exist in most geological formations between the travel time of compressional waves and the travel time of shear waves produced for a common impulse source of less than 15 kc. A simple sine wave impulse can be employed as the acoustical transmitted signal, but different types of such signals, and even complex signals, can be employed with the method herein described, with equal validity of result. The travel time of a compressional wave is readily determinable by observing the onset of the wave at two spaced apart receivers and by dividing the time difference results by the distance there between in terms of appropriate linear units of measurement, such as feet.

Because it is known that the range of shear wave to compression wave travel time ratios that exists for almost all geological formations, the approximate arrival of shear waves can be determined. In fact, after the compression wave velocity or travel time is known and by picking the largest number of the relationship range, it is possible to determine for a given return received sequence of cycles that no more compression wave cycles are detected after a predetermined amount of time after the initial onset. Therefore, the cycles that then occur are assumed to be shear wave cycles. By subtracting the time of arrival of such such detected shear wave cycle detected by a first receiver with the time of arrival of a corresponding detected shear wave cycle detected by a second receiver, and corresponding for the respective distances the receivers are from the transmitter that produces the impulse event causing the wave onsets, the travel time of the shear wave is determined.

This measurement is assured to be the shear wave travel time provided that its value fits within the window or limits of 1.55 to 1.9 times the compression wave travel time. If it does not fit the window, a cycle has been skipped somewhere, probably by the second receiver.

Therefore, it is a feature of the present invention to provide an improved shear wave velocity or travel time measurement of an acoustic signal by validating it with respect to the readily determinable velocity or travel time of the compression wave component thereof.

It is another feature of the present invention to provide an improved measurement of shear wave velocity or travel time in an acoustic signal that ensures against false data being employed because of signal cycle skipping.

SUMMARY OF THE INVENTION

The present invention employs two receivers and a transmitter for operating in conjunction with an acoustic signal, such as employed in a well-logging tool. The receivers detect the acoustical return signal in a plurality of cycles, the first several of which are compression wave cycles and, after a delay, the next several are shear wave cycles. The compression wave or travel time is determined by respectively detecting the corresponding zero-level crossings of the first cycles received of the compression wave onset and subtracting the time therebetween. The compression wave travel time is found by dividing the time difference into the distance in length measurement between the receivers.

Next, it is determined where it is safe to make a shear wave travel time measurement. This is done by first determining for the respective receivers the maximum time where compression wave cycles can still be occurring. After that time, it is assumed that the next cycle received is a shear wave cycle. This maximum time is determined by multiplying the compression time travel time by the distance from the transmitter to a receiver and further by a factor of 0.9, which is then added to the time of arrival of the first compression wave cycle.

The time differences from the respectively detected next cycles is then a measure of the travel time of the shear wave component provided that the shear wave travel time is in the range between 1.55 to 1.9 times the compression wave travel time. If not, then a cycle has been skipped by the second receiver.

Alternately, after the maximum period has been determined for the closest receiver to the transmitter, cycles can be selected for the second receiver until a result is obtained which gives a shear wave travel time in the 1.55–1.9-times-the-compression-wave-travel time result.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings for a part of this specification. It is noted, however, that the appended drawings illustrate only typical embodiments of the invention and are therefore not to be considered limiting of its scope, for the invention may admit to other equally effective embodiments.

In the Drawings.

DESCRIPTION OF THE PREFERRED EMBODIMENTS

Figure 1:
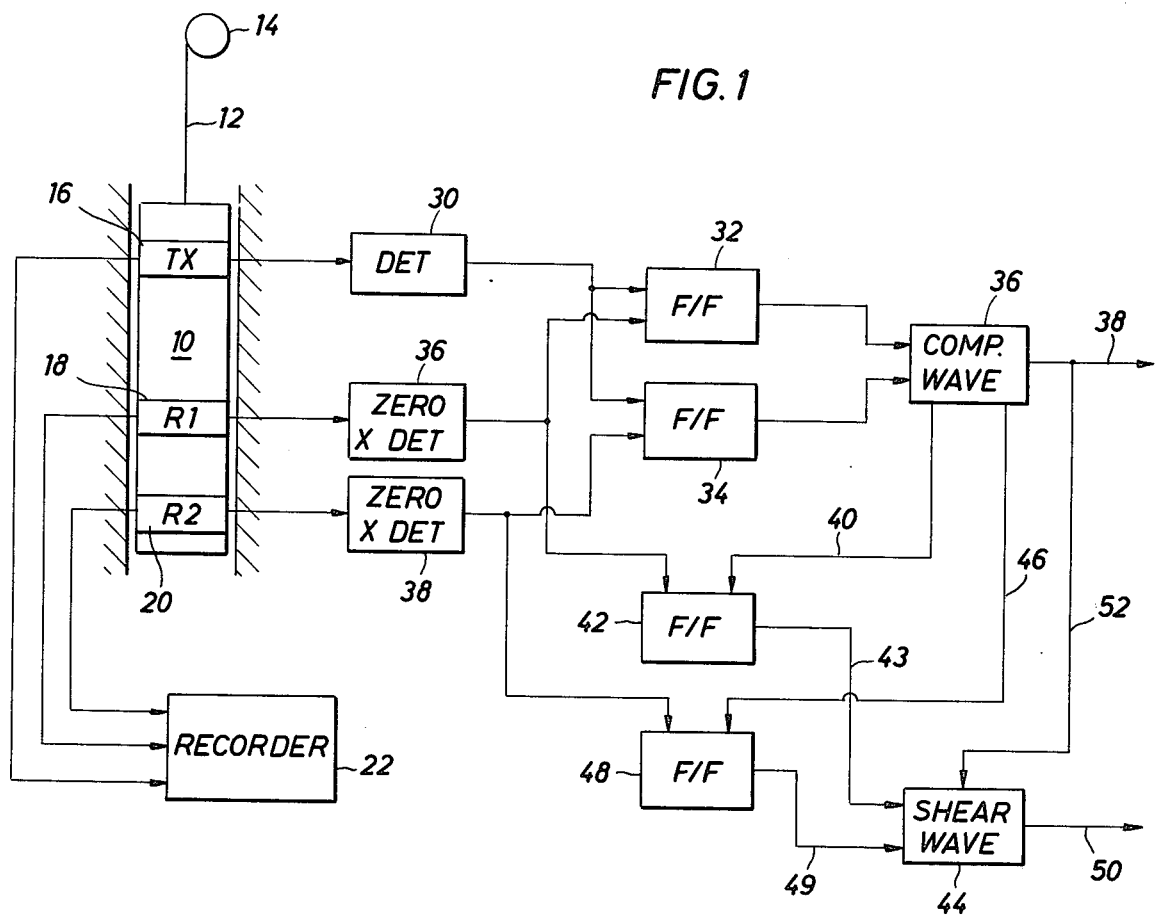
FIG. 1 is a simplified block diagram of a preferred embodiment of the present invention.

Now referring to the drawings and first to FIG. 1, a schematic representation of a typical acoustic well-logging tool 10 is shown suspended by cable 12 via a support and lowering/raising system schematically represented by winch 14. Cable 12 not only provides the necessary support for tool 10, but also comprises signalling and power lines for communicating appropriate signals down and up the cable, as will be explained more fully hereafter, and for providing power to the electronic components of the system housed in the tool.

The tool itself houses a transmitter 16 near the top of the tool and two receivers 18 (R1) and 20 (R2) near the bottom of the tool. These components of the acoustic welllogging system are typical electro-acoustical components and operate typically to produce a transmitted signal at a frequency in the range up to about 15 KHz. The transmitted signal is normally a pulse having a frequency response which would be in that frequency range, but it could be a sine wave, a pulse train or a complex pulse. The typical spacing of the components in the tool is such that receiver 18 is located four feet vertically below the transmitter and receiver 20 is located six feet vertically below the transmitter.

Figure 2A:
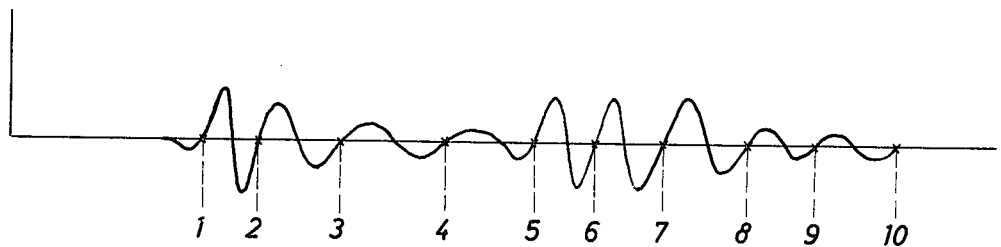
FIGS. 2a and 2b are waveform diagrams illustrating the invention, the diagrams being acoustic waveforms as a voltage function of time respectively as detected by receivers R1 and R2 in the embodiment shown in FIG. 1.
Figure 2B:
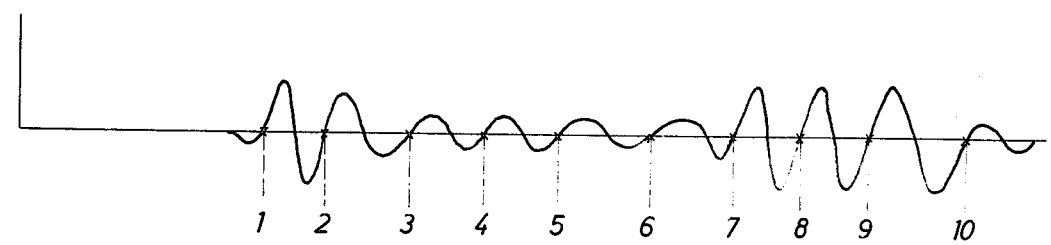

The acoustic impulse from the transmitter is produced on command as a result of a control signal from the surface and results in the generation of an acoustical wavefront into the adjacent formation. After propagating through the formation, a return wavefront is detected by both of the receivers. A return wavefront that corresponds to a transmitted wavefront is naturally received at receiver 20 at a time later than received at receiver 18, as shown in FIGS. 2a and 2b. Further, the returning cyclical wavefronts include within the first several cycles information concerning the compressional wave propagation and then the shear wave component propagation, the shear wave being known to arrive at the same receiver within the limits of 1.55 to 1.9 times the time of arrival of the corresponding compression waves.

Referring again to FIGS. 2a and 2b, please note that the first ten positive-going zero crossing of the return signal detected by receiver 18 are illustrated in FIGS. 2a and the first ten positive-going zero crossing of the return signal detected by receiver 20 are illustrated in FIG. 2b. The positive-going crossing are selected for illustrative purposes, but is equally valid to operate in accordance with the method herein described with respect to the respective negative-going zero crossings.

In order to determine the travel time of the compressional wave in travel time per foot (or other linear measurement indicia), the time of arrival of the first zero-crossing of the wave detected by the first receiver (receiver 18) is subtracted from the time of arrival of the corresponding first zero-crossing of the wave detected by the second receiver (receiver 20), and then the time difference is divided by the distance between the two receivers. In the illustrated example, if the time difference between the first zero crossing detected by the first receiver and the corresponding first zero crossing detected by the second receiver is 0.0001 seconds and the distance between the receivers is two feet, then the compressional wave travel time is 0.0001/2 =0.00005 seconds per foot (50 microseconds per foot).

With this information about compression wave travel time known, it can be determined that only shear wave returns are going to be detected after a predetermined time later. It is known that shear waves travel slower than compression waves. By experimentation, it has been discovered that the shear waves are somewhere between 1.55 and 1.9 times as slow as compression waves through virtually all geological formations. Therefore, to determine the maximum time in which some other kind of wave can exist in a detected series of cycles, the distance from the transmitter to the receiver in distance units (e.g., feet) is multiplied times the compression wave travel time as determined above. This product is then further multiplied by 0.9, which is then added to the time of arrival of the first zero level crossing after the impulse from the transmitter.

Therefore, by way of example with respect to receiver 18, assuring that the first zero-crossing occurs 0.0004 seconds after the production of the corresponding transmitted impulse and that receiver 18 is located 4 feet below transmitter 16, then the maximum time beyond which the next cycle is assumed to be a shear wave cycle is $$4 \times 0.00005 \times 0.9 + 0.0004 = 0.00058 \text{ seconds.}$$

For receiver 20 located 6 feet below the transmitter and whose initial compressional wave zero-crossing cycle occurred 0.0005 seconds after the transmitter impulse occurrence, the maximum time beyond which the next cycle is assumed to be a shear wave cycle is $$6 \times 0.00005 \times 0.55 + 0.0005 = 0.000665 \text{ seconds.}$$

It should be noted in the above that the first shear wave cycle zero crossing can occur respectively before the times indicated, but, in each instance, the next cycle zero crossing after those respective times are assuredly shear wave cycles.

In other words, for the second receiver, the quickest possible shear wave arrival is at the distance-corrected 1.55 times the compressional wave arrival. The next cycle after this time is compared to see if it fits within the required limits. If it does not fall within the proper limits, then the next cycle is used until the proper cycle is selected or until the distance-corrected 1.9 times the compressional travel time is exceeded. When this occurs, then there is no cycle within the given limits showing that a cycle has been overlooked by the second receiver that would correspond with the selected shear wave cycle of the second receiver.

The method can be employed by recording graphically by recorder 22 the transmitter impulse event and the detected returns sensed by both receivers 18 and 20 by conventional electronic logging divides operating in conjunction with an acoustic logging system. Such logs would develop traces similar to those shown in FIGS. 2a and 2b to which the principles above described could then be applied.

However, it is also possible to perform the detection techniques on the electronic signals as they occur. One system for doing this is also illustrated in FIG. 1. Detector 30 receives the impulse event from the transmitter and changes the state (i.e. resets or enable) of flip-flops 32 and 34 to which are also connected to zero level crossing detectors 36 and 38 which are connected respectively to sense the outputs from receivers 18 and 20. The outputs of flip-flops or bistable multivibrators 32 and 34 then are applied to a compresion wave indicator 36, which measures the difference in the time of arrival of the outputs from the respective flipflops 32 and 34 corresponding to the respective first zero-crossing events from the two receivers and divides by a standard number corresponding to the distance difference between the receivers. This compression wave indicator 36 produces a compression wave travel time measurement signal value on line 38, which can be separately metered and/or recorded, if desired. The compression wave indicator also provides certain control pulses via lines 40, 46, and 52 which will be described further below.

The compession wave travel time indicator also produces another output in the form of a trigger pulse for enabling a flip-flop 42 on line 40. This trigger pulse occurs at a time after the output from flip-flop 32 (the first zero level crossing received and detected by receiver 18) plus the compression wave travel time measurement multiplied by a fixed number, namely 0.55 times the number representing the distance between the transmitter and receiver 18. Once this trigger enables flip-flop 42, the next appropriate (e.g., positive-going) zero level crossing signal detected by detector 36 produces an output from flip-flop 42 to shear wave indicator 44 via line 43.

The compression wave indicator 36 also produces still another output in the form of a trigger pulse for enabling a flip-flop 48 via line 46. This trigger occurs at a time after the output from flip-flop 34 (the first zero level crossing received and detected by receiver 20) plus the compression wave travel time measurement multiplied by the same fixed number, namely 0.55 times the number representing the travel time between the transmitter and receiver 20. Compression wave indicator 36 provides a verification pulse output to the shear wave indicator 44 via line 52 at a time equal to the travel time of the compression wave between transmitter 18 and receiver 20 plus 0.9 times this travel time indication. Once this trigger pulse on line 46 enables flip-flop 48, the next appropriate (e.g., positive-going zero level crossing signal detected by detector 38 produces an output signal from flip-flop 48 to shear wave indicator 44 via line 49. Output 50 from shear wave indicator 44 is a measure of the difference between the time of arrival of the signal on line 43 and the time of arrival of the signal on line 49, provided that it is within the parameters of 1.55 times the output from compression wave indicator 36 and 1.9 times such output, which is the verification pulse applied via line 52. If the output is within these parameters, then the ouput is representative of the shear wave travel time. If the output is not within these parameters, then an indication of error in a detectable cyclical event would be shown, thereby self-assuring that the measurement is a proper one if one is given at all.

Of course, other electronic components could be used to practice the method described above with respect to the detected signals illustrated in FIGS. 2a and 2b, if desired.

The same results can be had by another technique utilizing the same principles employed in the method described above.

This second technique starts in the same manner by determining the compression wave travel time. From that value, it is possible to determine by the same technique as described above how to select a certain shear wave cycle zero-level crossing point for the first receiver. That is, by multiplying the compression wave travel time by a number corresponding to the distance between the transmitter and the first receiver and further by 0.55, it is possible to determine the minimum time after the first zero-level crossing where cycles corresponding to shear wave cycles can occur. That is, only shear wave cycles should occur after that point. Therefore, it is convenient to take the next one occurring.

For the second receiver, consecutive cycles are selected for measuring the difference in time of arrival to the corresponding zero-level crossing with that of the first receiver. When one is selected that produces a shear wave travel time that falls within 1.55 and 1.9 times the compression wave travel time, then it is known that the correct cycle has been selected for the second receiver for measuring shear wavel travel time.

Again, it is a simple thing to implement the above procedure either in terms of determining from recorded traces or to utilize logic and related electronic components, much in the same manner as for the first method, and to obtain the shear wave travel time value without inadvertently picking a cycle of the return signal detected by the second receiver that is a wrong cycle.

It is determined by either of the two alternate methods described above that there is a minimum time after the occurrence of the first detectable cycle of a return signal after which the next cycle is a cycle suitable for shear wave velocity or travel time measurement. Such cycle could be the second or even later number of the actual shear wave cycles. But, it is better to let such possible earlier, and possible higher amplitude, shear wave cycle pass and select a certain shear wave cycle than to select a cycle that may not be a shear wave cycle.

Also, the positive-going zero-level crossing has been used by way of example. The negative-going crossings could be selected and used with equal validity to the results, if desired.

Also, it is assumed that the transmitter impulse is at 15 KHz or below. If the impulse is higher in frequency, the factors of of 1.55 to 1.9 would be adjusted for the difference in travel time of the frequency used.

While particular embodiments of the invention have been shown and described, and several variations therefrom have been discussed, it will be understood that the invention is not limited thereto, since many modifications may be made and will become apparent to those skilled in the art.

I claim:

1. A system for detecting acoustic shear wave travel times in earth formations penetrated by a well borehole, comprising:

means for repetitively generating pulses of acoustic energy in a well borehole and for generating a first timing control pulse coincident with each such generation of acoustic energy;

first and second acoustic receiver means spaced longitudinally from each other by a distance of approximately two feet and from said acoustic generating means by a distance of approximately four feet to the nearest receiver in a well borehole;

first and second event detection means responsive to zero crossings and connected to the outputs respectively of said first and second acoustic receiver means and capable of generating output signals upon the occurrence of zero crossing events in the outputs of said receiver means;

means responsive to said timing control pulse and said event detection means for generating compression wave arrival signals indicative of the travel time of compression waves between said longitudinally spaced receiver means and for generating second, third and fourth timing control pulses, at times beginning at 1.55 times the compression wave travel time and 1.90 times the compressional waves travel time from said acoustic generating means to said first and second acoustic receiver means; and means responsive to said second, third and fourth timing control pulses and to said output signals of said event detection means for generating shear wave arrival signals indicative of the travel time of shear waves falling within a predetermined travel time ratio in the range of 1.55 to 1.90 times the compression wave travel time between said longitudinally spaced receiver means.

2. The system of claim 1 wherein said zero crossings are positive going zero crossings.

3. the system of claim 2 wherein said means for genearating compression wave and shear wave arrival signals include bistable multivibrator means.

4. The system of claim 1 wherein said first and second event detection means are responsive to positive peak events in the outputs of said first and second receiver means.

5. The system of claim 1 wherein said first and second event detection means are responsive to negative peak events in the outputs of said first and second receiver means.

* * * * *